April 23, 1957 C. F. MOSELEY 2,789,846
SELF-LUBRICATING OIL WELL STUFFING BOX
Filed Jan. 20, 1954

INVENTOR.
C. F. Moseley
BY
ATTORNEY

United States Patent Office

2,789,846
Patented Apr. 23, 1957

2,789,846

SELF-LUBRICATING OIL WELL STUFFING BOX

Charles Fredrick Moseley, Bartlesville, Okla.

Application January 20, 1954, Serial No. 405,190

3 Claims. (Cl. 286—17)

This invention relates to packing glands and more particularly, but not by way of limitation, to an improved duplex type stuffing box adapted for use around the polished rod of a producing oil well.

As it is well known in the oil industry, the majority of producing oil wells are pumped by use of a rod type pump. The pumping unit is installed near the bottom of the oil well and is actuated by a string of rods from the surface. The uppermost rod, which projects from the well head, is commonly called the polished rod. A packing gland or stuffing box is ordinarily secured to the well head around the polished rod to prevent a leakage of the pumped oil around the polished rod. Generally speaking, there are two types of stuffing boxes in common use. For oil wells having a continuous production, a stuffing box utilizing a single packing gland is ordinarily used. In some wells, however, the production is intermittent and may cease from the lack of oil in the well, even when the pumping unit is in operation. A duplex type stuffing box is ordinarily used on the latter type of oil wells and is provided with a lubricating section to continuously lubricate the polished rod. With this arrangement, the polished rod will not "run dry" and ruin the packing rings.

The usual duplex type stuffing box utilizes a flat packing ring in the upper section of the box for retaining a supply of lubricant around the polished rod above the usual packing rings which are disposed in the lower portion of the box. These flat type packing rings are frequently ineffective in retaining the lubricant within the stuffing box. It is normally impractical to provide a sufficient pressure on the flat type packing rings for preventing leakage of the lubricant around the polished rod.

The present invention contemplates a duplex stuffing box utilizing a cone shaped packing ring for retaining a supply of lubricant within the stuffing box and around the polished rod. With this construction, a supply of lubricant will be constantly maintained without leakage upwardly around the polished rod even though the oil well fails to produce during reciprocation of the polished rod. The cone type packing ring is retained in the stuffing box by a novel packing gland which is adjustable independently of the stuffing box proper.

An important object of this invention is to constantly lubricate the polished rod of an intermittently producing oil well.

Another object of this invention is to prevent leakage from the upper end of a duplex type oil well stuffing box.

A further object of this invention is to increase the service life of the main packing rings of an oil well stuffing box.

Another object of this invention is to provide a novel upper gland for a duplex type stuffing box which may be adjusted independently of the stuffing box proper.

A still further object of this invention is to provide a simply constructed duplex oil well stuffing box which may be economically manufactured.

Other objects and advantages of the invention will be evident from the following detailed description, read in conjunction with the accompanying drawings, which illustrate my invention.

Figure 1:
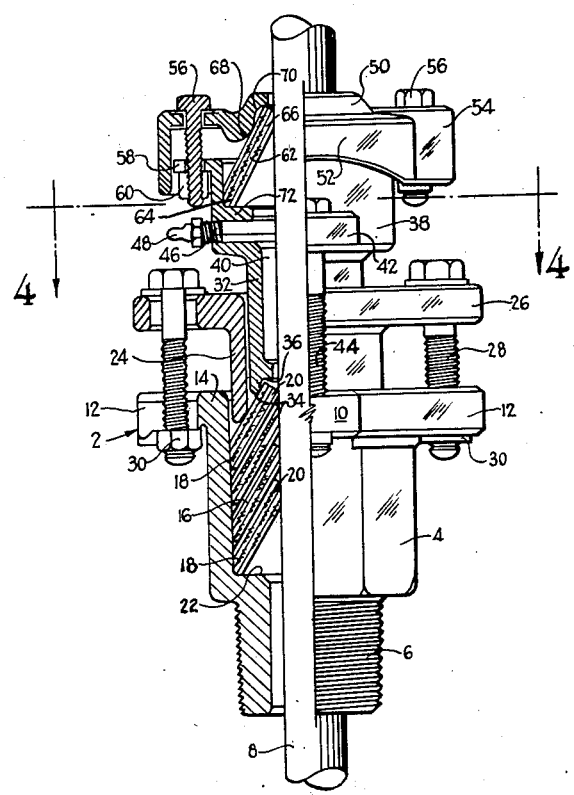
Figure 1 is a vertical elevation view of a novel duplex stuffing box having a quarter section removed.

Referring to the drawings in detail, and particularly Fig. 1, reference character 2 generally designates a novel duplex stuffing box comprising a tubular shaped body or housing 4 having its lower end 6 reduced in diameter and externally threaded for connection with a well head (not shown). The usual polished rod 8 extends vertically through the central portion of the stuffing box 2 and reciprocates therethrough as will be hereinafter set forth. Two sets of diametrically opposed outwardly extending flanges 10 and 12 are formed on the upper end 14 of the body 4.

A plurality of super-imposed conical shaped packing rings 16 are disposed in the body 4 around the polished rod 8. Each packing ring 16 is arranged with its larger end 18 extending downwardly in contact with the inner periphery of the body 4 and its smaller end 20 extending upwardly in contact with the polished rod 8. The large end 18 of the lowermost packing ring 16 rests on a shoulder 22 formed in the body 4 by the reduction in diameter thereof.

A tubular shaped packing gland 24 is inserted in the upper end 14 of the body 4 and is adapted to press downwardly on the packing rings 16. The packing gland or compression member 24 is slightly smaller in diameter than the body 4 to contact the uppermost packing ring 16 in proximity with the lower larger end thereof. Diametrically opposed lugs 26 extend outwardly from the upper end of the gland 24 and are apertured to receive bolts 28 for connection with the lugs 12 of the body 4. A suitable nut 30 is secured on the lower end of each bolt 28 below the lugs 12 to permit a tightening of the bolts 28 and downward movement of the packing gland 24.

An upper tubular shaped gland 32 is inserted in the lower gland 24 loosely around the polished rod 8. The diameter of the gland 32 is such that the lower end 34 contacts the uppermost packing ring 16 in proximity with the smaller end 20 thereof. A circumferential groove 36 is formed in the inner periphery of the gland 32 adjacent the lower end 34 for purposes as will be hereinafter set forth.

Figure 4:
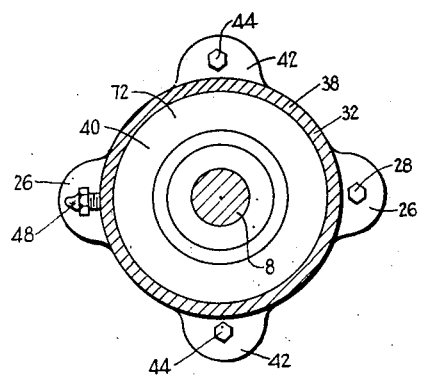
Figure 4 is a cross sectional view taken along lines 4—4 of Fig. 1.

The gland 32 extends upwardly above the gland 24 and is provided with an enlarged section 38 forming a reservoir 40 around the polished rod 8. A pair of diametrically opposed lugs 42 (see also Fig. 4) extend outwardly from the opposite sides of the enlarged portion 38 and are connected by bolts 44 to the lugs 10 of the body 4. A threaded aperture 46 is formed transversely in the portion 38 at right angles to the lugs 42 to receive a suitable grease fitting 48. It will be apparent that the aperture 46 provides communication between the grease fitting 48 and the chamber 40.

A circular shaped apertured cap 50 is disposed loosely around the polished rod 8 above the enlarged portion 38 of the gland 32. The cap 50 is provided with a downwardly extending circumferential flange 52 to receive the upper end of the gland portion 38. Diametrically opposed lugs 54 (see also Figs. 2 and 3) extend outwardly from the opposite sides of the cap 50 and are apertured to receive tightening bolts 56. Mating flanges 58 extend outwardly from the upper end of the gland portion 38 to receive the lower portions of the bolts 56. The lugs 54 are substantially cup shaped and are of a size to receive the flanges 58 of the gland 32. Nuts 60 are threaded on the lower end of each bolt 56 below the flanges 58 to provide a tightening of the cap 50 on the gland 32 as will be hereinafter set forth.

An upper packing ring 62 is disposed in the chamber 40 in the upper portion of the section 38. The packing ring 62 is also conical shaped and is disposed with its larger end 64 extending downwardly and in contact with the inner periphery of the enlarged section 38 of the gland 32. The upper smaller end 66 of the packing ring 62 remains in sealing contact with the polished rod 8. A circumferential shoulder 68 is formed on the under surface of the cap 50 and is of a size to contact the packing ring 62 for compressing the packing ring 62 into sealing contact with the polished rod 8 and the gland portion 38. A circumferential groove 70 is also formed in the under face of the cap 50 inwardly of the shoulder 68 in a position opposite the upper end 66 of the packing ring 62. The large lower end 64 of the packing ring 62 rests on a circumferential shoulder 72 formed on the inner periphery of the enlarged section 38 adjacent the lower end thereof.

Figure 2:
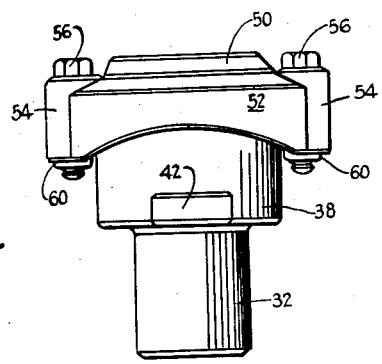
Figure 2 is a detailed elevational view of a novel upper gland for a duplex stuffing box.
Figure 3:
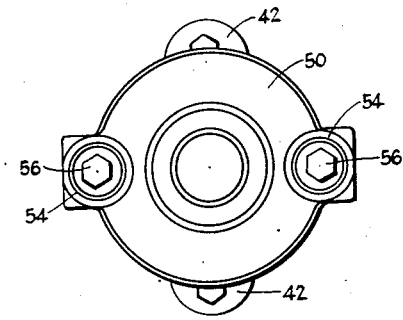
Figure 3 is a plan view of the upper gland shown in Fig. 2.

Referring to Figs. 1 to 3, it will be observed that the lugs 54 and 58 are disposed at right angles to the lugs 42, thereby facilitating the accessibility of the bolts 56 and nuts 60 for compressing the packing ring 62.

*Operation*

The stuffing box 2 is assembled as shown in Fig. 1 with the lower end 6 of the body 4 threaded into the well head. Prior to reciprocation of the polished rod 8, a suitable lubricant is injected through the fitting 48 into the chamber 40. It will be apparent that upon operation of the rod 8, the lubricant contained in the chamber 40 will provide a constant lubrication of the polished rod 8 and prevent the main packing rings 16 from running dry, regardless of whether the well is producing oil. The packing rings 16 will effectively seal off the well head pressure and prevent an upward flow or leakage of well fluid through the body 4, as well as prevent a leakage of the lubricant from the chamber 40 downwardly along the polished rod 8 when the well is not producing.

During reciprocation of the rod 8, the packing rings 16 and 62 will be slightly deformed. However, the groove 36 will permit an expansion of the upper end 20 of the uppermost packing ring 16 and the groove 70 will permit an expansion of the upper end 66 of the packing ring 62, thereby preventing undue distortion of the packing rings. In the event well fluid leaks upwardly through the body 4, the packing rings 16 may be further compressed by tightening the bolts 28 and 44. A tightening of the bolts 28 will provide a downward movement of the lower gland 24 and a compression of the packing rings 16 adjacent the outer peripheries thereof, and a tightening of the bolts 44 will provide a downward movement of the upper gland 32 with a resulting compression of the packing rings 16 adjacent their inner peripheries. Thus, the packing rings 16 may be brought into tighter engagement with the polished rod 8 and inner periphery of the body 4.

The packing ring 62 prevents an upward leakage of the lubricant from the chamber 40. In the event the packing ring 62 becomes worn, it may be further compressed by tightening the bolts 56 and moving the shoulder 68 downwardly. Thus, the packing ring 62 may be compressed independently of the main packing rings 16 and will effectively retain the lubricant in the chamber 40. It will also be noted that the chamber 40 may be supplied with additional lubricant through use of the fitting 48, even during operation of the stuffing box 2.

From the foregoing, it is apparent that the present invention provides a novel duplex type oil well stuffing box which will provide a constant lubrication of the oil well polished rod. The service life of the main packing rings will be materially increased and the well head pressure retained. The stuffing box is provided with a novel upper gland adjustable independently of the stuffing box proper and which will effectively maintain a constant supply of lubricant for the polished rod.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A stuffing box for an oil well polished rod, comprising a tubular body loosely surrounding the polished rod, a plurality of super-imposed conical shaped packing rings in the body around the polished rod, a tubular gland extending into the upper end of the body into contact with the uppermost packing ring adjacent the outer periphery thereof, a pair of diametrically opposed bolts adjustably securing the gland to the body, a second gland extending into the upper end of the body into contact with the uppermost packing ring adjacent the inner periphery thereof, a pair of diametrically opposed bolts disposed at right angles to said first mentioned bolts and adjustably securing said second gland to the body, an oil reservoir in said second gland around the polished rod, a conical shaped packing ring in the upper portion of said second gland forming the upper end of said oil reservoir, and means adjustably secured to the second gland for tightening the last mentioned packing ring.

2. A stuffing box for an oil well polished rod, comprising a tubular body loosely surrounding the polished rod, a plurality of super-imposed conical shaped packing rings in the body around the polished rod, a tubular gland extending into the upper end of the body in contact with the uppermost packing ring adjacent the outer periphery thereof, and adjustably secured to the body by a pair of diametrically opposed bolts, a second tubular gland extending into the upper end of the body in contact with the uppermost packing ring adjacent the inner periphery thereof and adjustably secured to the body by a pair of diametrically opposed bolts at right angles to said first mentioned bolts, a conical shaped packing ring in the upper portion of said second gland around the polished rod, a cap adjustably secured on said second gland retaining the last mentioned packing ring in compression in contact with the polished rod and the inner periphery of the second gland, and means for supplying lubricant to said second gland between the first and last mentioned packing rings.

3. A stuffing box for an oil well polished rod, comprising a tubular body loosely surrounding the polished rod, a plurality of super-imposed conical shaped packing rings in the body around the polished rod, a tubular gland extending into the upper end of the body into contact with the uppermost packing ring adjacent the outer periphery thereof, a pair of diametrically opposed bolts adjustably securing the gland to the body, a second tubular gland loosely surrounding the polished rod and extending into contact with the uppermost packing ring adjacent the inner periphery thereof, a pair of diametrically opposed bolts disposed at right angles to said first mentioned bolts and adjustably securing said second gland to the body, a packing ring in the upper portion of said second gland around the polished rod, a cap on the upper end of the second gland in contact with said last mentioned packing ring, a pair of diametrically opposed bolts at right angles to the second mentioned bolts adjustably securing the cap to the second gland, and means for supplying lubricant to the interior of the second gland between the first and last mentioned packing rings.

References Cited in the file of this patent

UNITED STATES PATENTS

| | | |
|---|---|---|
| 731,228 | Rush | June 16, 1903 |
| 1,971,542 | Taylor | Aug. 28, 1934 |
| 2,056,687 | Moseley | Oct. 6, 1936 |

FOREIGN PATENTS

| | | |
|---|---|---|
| 25,138 | Great Britain | of 1898 |